United States Patent
Masetto et al.

(10) Patent No.: US 8,419,830 B2
(45) Date of Patent: Apr. 16, 2013

(54) APPARATUS AND METHOD FOR DISTRIBUTING A PLURALITY OF FLUID FLOWS THROUGH A PLURALITY OF CHAMBERS, PARTICULARLY FOR CARRYING OUT ADSORPTION PROCESSES

(75) Inventors: Gianclaudio Masetto, Monza (IT); Francesco Masetto, Monza (IT); Claudia Masetto, Monza (IT)

(73) Assignee: Polaris S.R.L., Monza (IT)

( * ) Notice: Subject to any disclaimer, the term of this patent is extended or adjusted under 35 U.S.C. 154(b) by 233 days.

(21) Appl. No.: 12/812,228

(22) PCT Filed: Jan. 23, 2009

(86) PCT No.: PCT/EP2009/050767
§ 371 (c)(1),
(2), (4) Date: Jul. 8, 2010

(87) PCT Pub. No.: WO2009/092784
PCT Pub. Date: Jul. 30, 2009

(65) Prior Publication Data
US 2010/0300145 A1 Dec. 2, 2010

(30) Foreign Application Priority Data
Jan. 25, 2008 (IT) .............................. MI2008A0115

(51) Int. Cl.
*B01D 53/04* (2006.01)
(52) U.S. Cl.
USPC .............................................. 95/148; 96/124
(58) Field of Classification Search .................... 96/121, 96/124, 125; 95/107, 113, 114, 148
See application file for complete search history.

(56) References Cited

U.S. PATENT DOCUMENTS

| 1,387,857 A | 8/1921 | McKee |
| 1,602,500 A | 10/1926 | Nuss |
| 2,312,941 A | 3/1943 | Tucker |
| 2,751,033 A * | 6/1956 | Miller ........................ 96/124 |
| 3,489,178 A | 1/1970 | Kice |
| 4,469,494 A | 9/1984 | van Weenen |

(Continued)

FOREIGN PATENT DOCUMENTS

| EP | 1221337 | 7/2002 |
| EP | 1382375 | 1/2004 |
| EP | 1683563 | 7/2006 |

OTHER PUBLICATIONS

International Search Report and Written Opinion in PCT/EP2009/050767, parent application to the present application.

*Primary Examiner* — Frank Lawrence, Jr.
(74) *Attorney, Agent, or Firm* — Shalom Wertsberger; Saltamar Innovations

(57) ABSTRACT

An apparatus and method for adsorption of organic and inorganic volatile compounds in gas flows by continuous and simultaneous distribution of a plurality of primary and secondary flows, through particular distribution and shut-off devices, to a plurality of chambers, in which the individual energy and mass transfer operations associated with such adsorption occur. High flow-rate and/or concentration are accommodated, following a cyclic adsorption/regeneration process, in which a part of the adsorbent material is used to separate the compounds in gas flows, while the rest of the material sequentially undergoes two or more desorption steps in a stabilized atmosphere suitable to carry the desorbed compounds at very high concentrations, and a final cooling step in a stabilized atmosphere, for preparing the material for continuing the process.

9 Claims, 16 Drawing Sheets

U.S. PATENT DOCUMENTS

| | | | |
|---|---|---|---|
| 4,475,929 A | 10/1984 | Fuderer | |
| 4,968,334 A | 11/1990 | Hilton | |
| 5,057,128 A | 10/1991 | Panzica et al. | |
| 5,112,367 A | 5/1992 | Hill | |
| 5,133,784 A | 7/1992 | Boudet et al. | |
| 5,169,414 A * | 12/1992 | Panzica et al. | 95/113 |
| 5,248,325 A | 9/1993 | Kagimoto et al. | |
| 5,256,174 A | 10/1993 | Kai et al. | |
| 5,632,804 A | 5/1997 | Schartz | |
| 5,681,376 A | 10/1997 | Wooten et al. | |
| 5,779,771 A | 7/1998 | Wooten et al. | |
| 5,807,423 A | 9/1998 | Lemcoff et al. | |
| 5,814,131 A | 9/1998 | Lemcoff et al. | |
| 5,827,358 A * | 10/1998 | Kulish et al. | 96/115 |
| 5,891,217 A | 4/1999 | Lemcoff et al. | |
| 6,063,161 A * | 5/2000 | Keefer et al. | 95/100 |
| 6,143,056 A | 11/2000 | Smolarek et al. | |
| 6,253,778 B1 | 7/2001 | Smolarek et al. | |
| 6,936,091 B2 | 8/2005 | Bayreuther | |
| 7,276,107 B2 * | 10/2007 | Baksh et al. | 95/96 |
| 7,294,173 B2 | 11/2007 | Masetto et al. | |
| 7,846,239 B2 * | 12/2010 | Yamawaki et al. | 95/90 |
| 7,854,794 B2 * | 12/2010 | Barone | 96/124 |
| 8,025,720 B2 * | 9/2011 | Barclay et al. | 96/115 |
| 2008/0029001 A1 * | 2/2008 | Matsui et al. | 110/244 |

\* cited by examiner

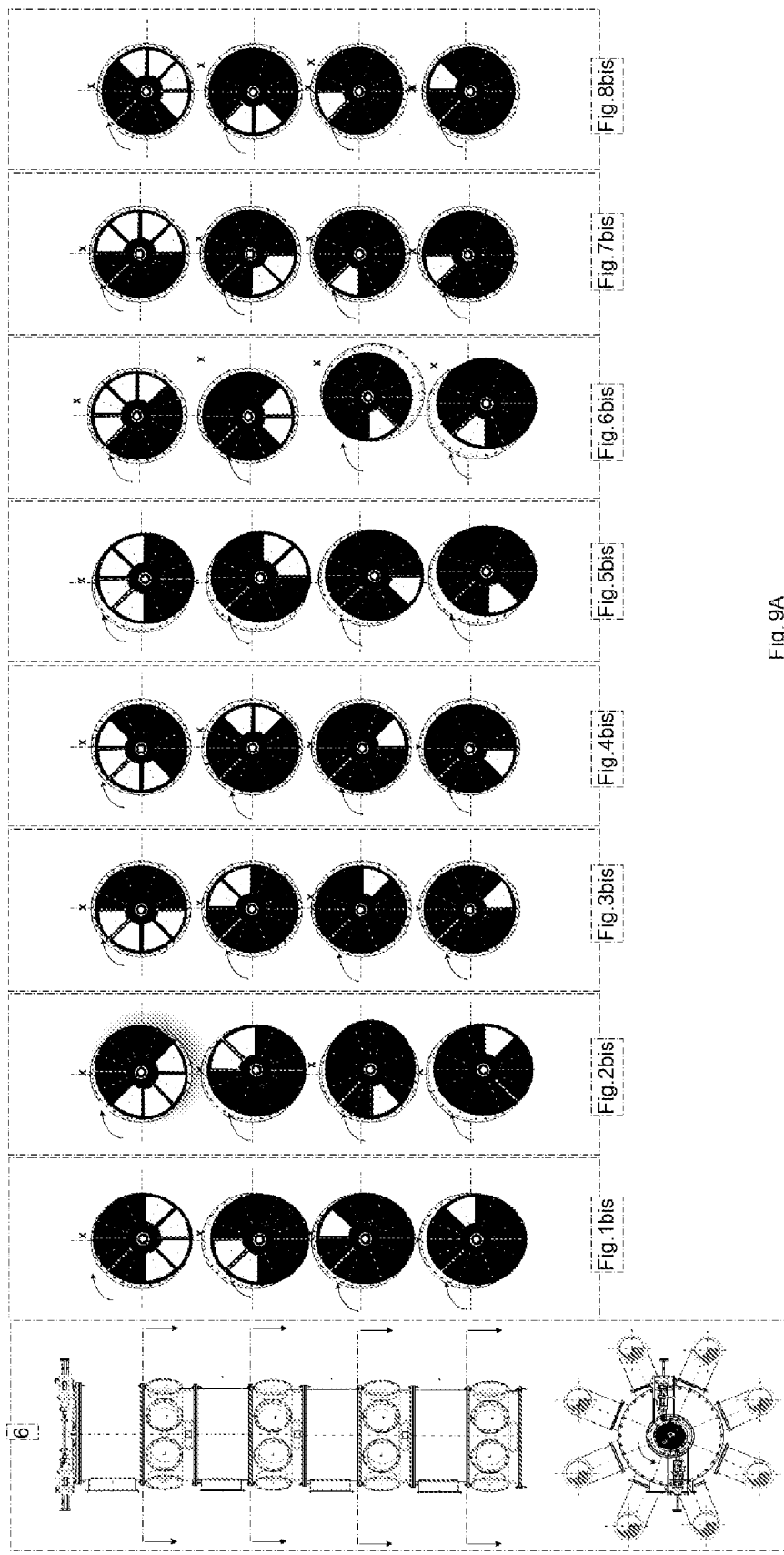

APPARATUS AND METHOD FOR DISTRIBUTING A PLURALITY OF FLUID FLOWS THROUGH A PLURALITY OF CHAMBERS, PARTICULARLY FOR CARRYING OUT ADSORPTION PROCESSES

An apparatus and method is disclosed herein for adsorption of organic and inorganic volatile compounds in gas flows by continuous and simultaneous distribution of a plurality of primary and secondary flows, through particular distribution and shut-off devices, to a plurality of chambers, in which the individual energy and mass transfer operations associated with such absorption occur.

Particularly, an apparatus and method is disclosed herein for separating organic and inorganic compounds in gas flows, preferably at high flow-rate and/or concentration, by using adsorbent resins (special active carbons or other types of molecular sieves opportunely located in a plurality of process chambers, following a cyclic adsorption/regeneration process, in which a part of the adsorbent material is used to separate the compounds in gas flows, while the rest of the material sequentially undergoes two or more desorption steps in a stabilized atmosphere suitable to carry the desorbed compounds at very high concentrations, preferably for later recovering them in liquid form or transferring them to combustion, and a final cooling step in a stabilized atmosphere, for preparing the material for continuing the process.

Particularly, the apparatus and method disclosed herein optimally combine the use of a valuable energy resource, such as liquid nitrogen, required for effectively addressing economic (compound recovery) or environmental (emission remediation) issues, and the solution of adsorption-related safety problems.

BACKGROUND OF THE INVENTION

A variety of prior art technologies use adsorption processes for separating chemical compounds from gas flows, by passing such flows through a non-cohesive adsorbent material, typically activated carbons, macroporous resins, zeolites, silica gels, activated alumina or other types of molecular sieves.

These prior art technologies, resulting from the development of adsorption applications, may be divided into three base types, i.e. a first type based on discontinuous fixed beds, a second type based on continuously fluidized beds, a third type based on continuously rotating beds, as well as a number of hybrid technologies resulting from the integration of these basic technologies with others used upstream or downstream.

In view of providing solutions to the environmental problems caused by the increasing air pollution, environment protection regulations define increasingly restrictive contamination limits, wherefore the need arises for highly effective and reliable technologies.

Also, further directives, particularly concerning industrial processes, encourage research and use of technologies that involve a lower power consumption impact and a maximized recovery of reusable raw materials.

Referring to the above mentioned environment protection and economic issues, fluidized-bed and rotary-bed adsorption technologies may provide poor results in terms of effectiveness, efficiency and versatile operation, unless they are integrated with other technologies.

Particularly, a rotary bed, i.e. a compact apparatus that requires a smaller amount of adsorbent material due to intensive use thereof, is usually only effective as a first concentration stage for concentrating the volatile compounds contained at low concentration in gas flows, thereby generating a secondary gas flow, typically concentrated to 10-20 times, requiring a further separation for compound recovery, e.g. in a downstream fixed-bed adsorption system.

Patent application EP 1 683 563 A2 by the applicant hereof, discloses a continuous, rotary-bed gas purification system.

In this type of system, the adsorbent material is contained in a continuously rotating hollow disk-shaped rotor.

A plurality of gas flows simultaneously and pass through different sectors of such rotor.

One sector is passed through by the gas flow to be purified during adsorption, one sector is passed through by a first stabilized hot gas flow during desorption (for adsorbent material regeneration and recovery of desorbed compounds), one sector is passed through by a second stabilized desorption gas flow (for removal of the last compound traces), in series with the former, and one sector is passed through by a cooling gas flow.

The above process steps are cyclically repeated.

Typically, one operating cycle lasts from 0.25 h to 1 h.

Under the same treatment capacity conditions, the system of the above patent application requires a smaller amount of adsorbent material, due to its intensive use thereof, as well as lower investment costs, lower installation space requirements and a more regular consumption of utilities.

Particularly, the secondary gas flow is inert and contains the desorbed compounds at concentrations 100 to 200 higher than the primary incoming flow, wherefore such compounds may be conveniently recovered by simple condensation.

Other rotary-bed adsorption technologies are disclosed by many other patents.

Nonetheless, the mechanical complexity of rotary-bed systems is acceptable as long as the rotor has a small size, as related to the flow rates and the amount of compounds to be separated.

Fixed-bed adsorption technologies are still the most commonly used, in spite of their drawbacks in terms of investment and running costs, irregular consumption of utilities, operation safety problems, and dimensions, as related to the flow rates to be handled.

Here, continuous flow purification requires at least two fixed beds, which are alternately operated for adsorption or regeneration, each operating step lasting many hours (typically 4-12 h).

A number of patents disclose technological variants based on fixed-bed adsorption.

For instance, patent EP 1 492 610 B1 (U.S. Pat. No. 7,294, 173 B2) by the applicant hereof, discloses a gas flow purification system which uses fixed beds with alternate adsorption and desorption steps. The desorption step is carried out by alternating bed desorption cycles, by circulation of hot inert gas at atmospheric pressure, with high-vacuum desorption cycles, for removing the last traces of polluting compounds.

The purpose of the above patent is to achieve superior purification effectiveness to meet the most restrictive requirements, as well as maximum operating safety.

Also, the need still exists for adsorption technologies which both ensure the high effectiveness of fixed-bed systems and have short cycles, for their operation to be as close as possible to continuous operation, using compact apparatuses, with regular consumption of utilities, and hence with all typical advantages of rotary systems.

The achievement of these purposes introduces a number of process and cost complications, which are particularly associated with the simultaneous distribution of multiple flows, having different and incompatible characteristics, to multiple adsorbent material containers, which complications become increasingly apparent as process flow rates increase.

Many patents provide alternative solutions to the problem of ensuring distribution of multiple flows to multiple adsorbent material containers, as used for the various steps of fixed-bed liquid or gas phase adsorption processes, which solutions rely on the use of rotary devices instead of complex valves and piping systems and their respective arrangement systems.

U.S. Pat. Nos. 1,387,857; 1,602,500; 2,312,941; 3,489,178; 4,469,494; 4,469,494; 4,968,334; 5,057,128; 5,112,367; 5,133,784; 5,248,325; 5,256,174; 5,632,804; 5,681,376; 5,779,771; 5,807,423; 5,814,131; 5,891,217; 6,063,161; 6,143,056; 6,253,778; 6,936,091 may be mentioned as an example.

The object of the present invention is to at least partially obviate the process and operational problems of the prior art, by providing an apparatus that is specially conceived to obviate the above construction and dimensional shortcomings, as well as a particularly effective, safe and reliable adsorption method, to be carried out using such apparatus.

In view of achieving such advantages to some extent, the method provides intensive use of adsorbent material with special characteristics, by dividing it into a larger number of smaller beds, and simultaneously performing adsorption and regeneration steps thereon in shorter operating cycles, using said apparatus and thus providing a semi-continuous process.

DESCRIPTION OF THE FIGURES

Certain possible embodiments of the systems and methods of the invention will be described herein below with reference to the annexed drawings, in which:

FIGS. 6 to 6A show internal construction details of the modules of FIG. 11, belonging to the distribution devices (2) and (6);

FIG. 9A shows the position of the plugs in the four modules for each of the eight switching patterns provided by the distribution device (6);

DESCRIPTION OF THE APPARATUS

Figure 1:
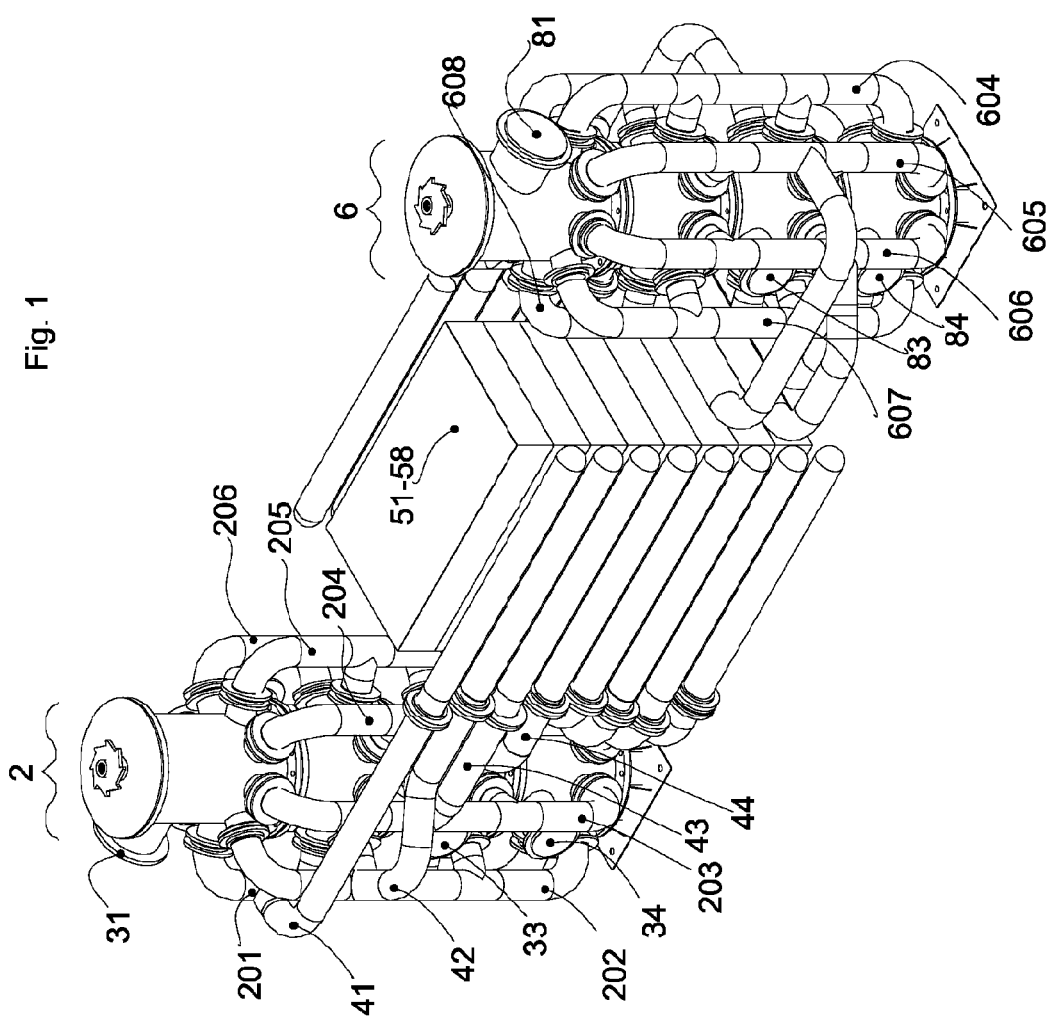
FIGS. 1 and 1A are two general perspective views of the apparatus.
Figure 1A:
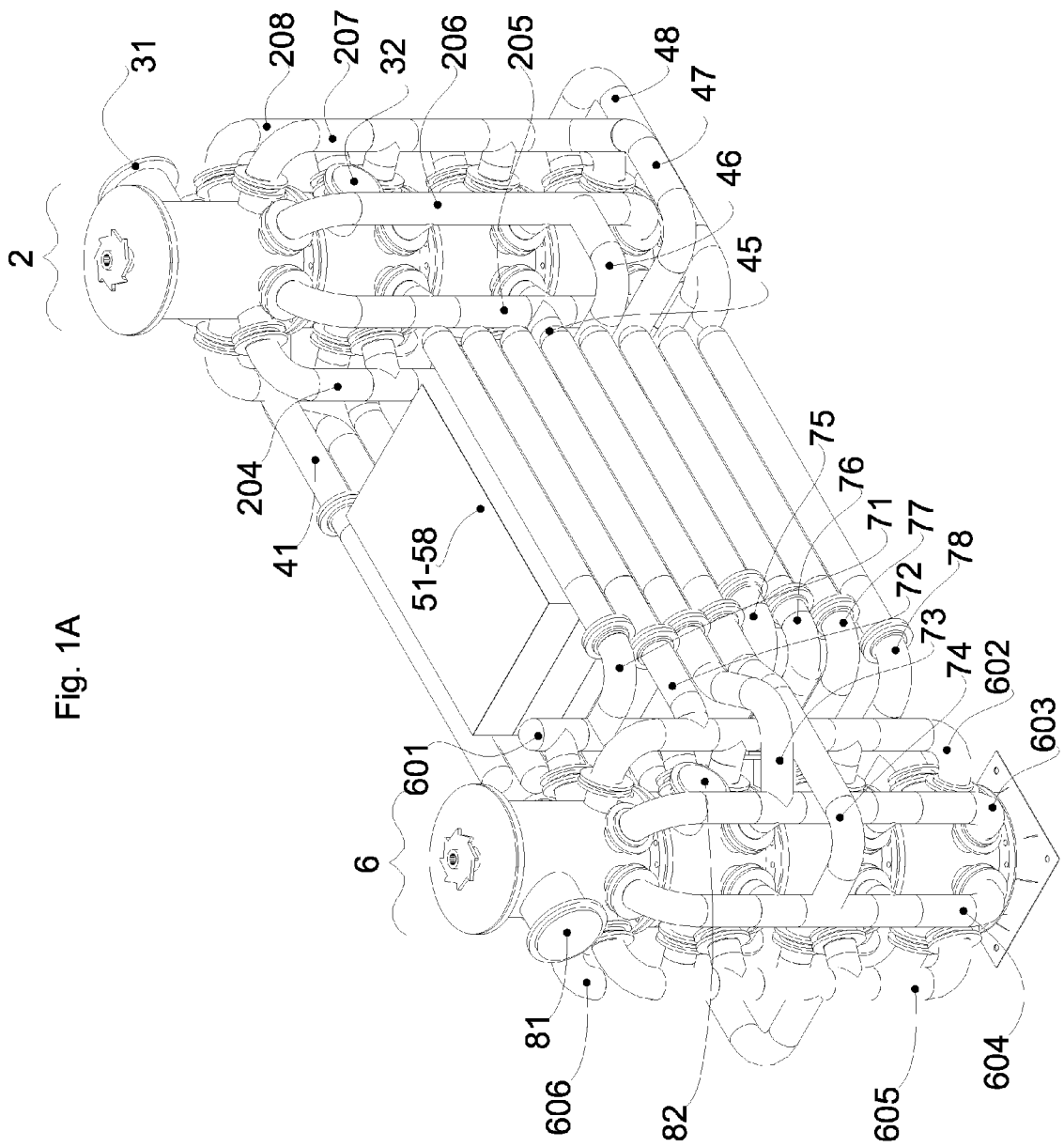
Figure 1B:
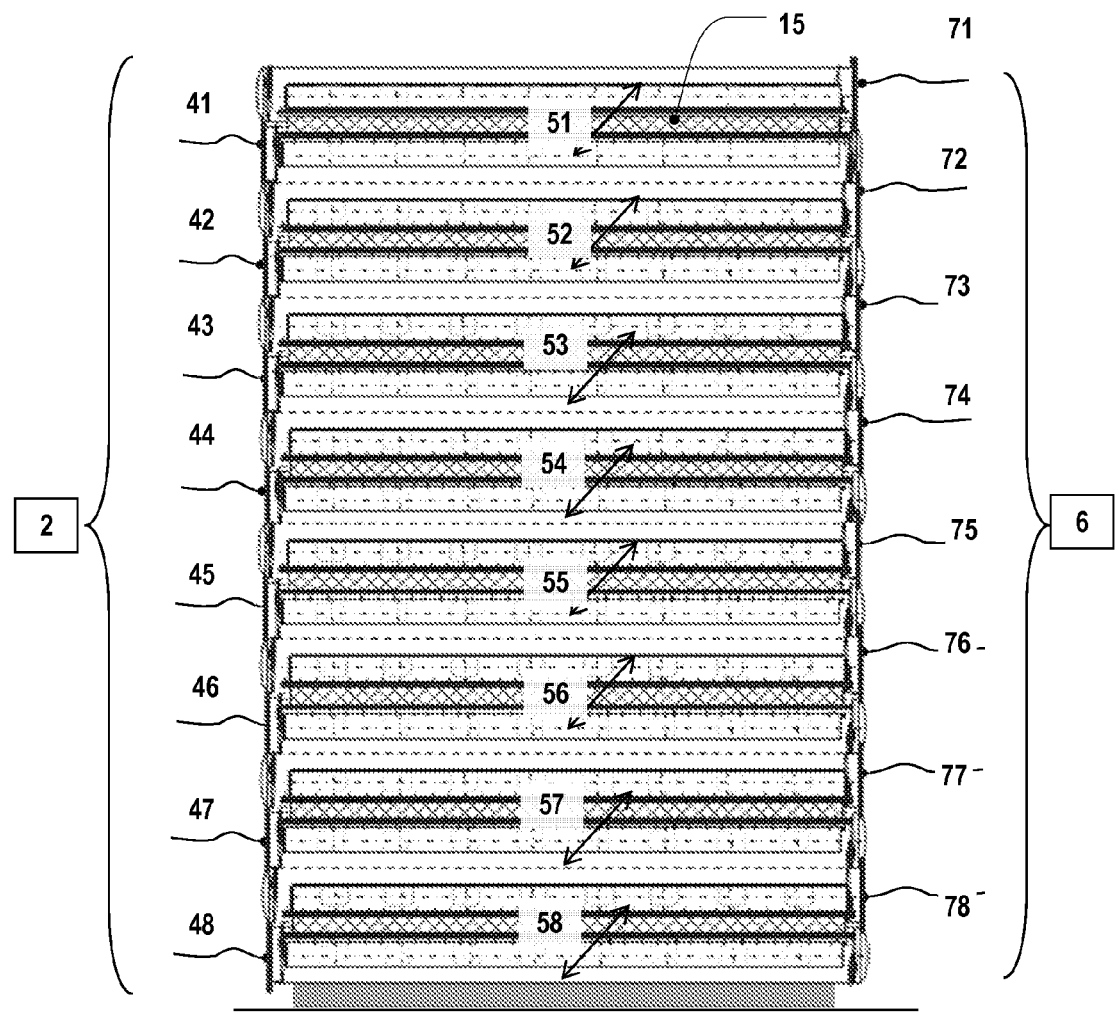
FIG. 1B is a schematic sectional view of the process chambers of the apparatus.

Referring to the annexed drawings, which disclose possible exemplary embodiments of the invention, FIGS. 1 and 1b disclose an apparatus comprising a first fluid flow distribution device 2, with no mixing feature, having a plurality P of inlet lines 31, 32, 33, 34 and a plurality of N outlet lines 41, 42, 43, 44, 45, 46, 47, 48, where $N \geq P$.

This description relates to an exemplary case in which P=4 and N=8.

The first distribution device 2 selectively connects each outlet line 41, 42, 43, 44, 45, 46, 47, 48 to one inlet line 31, 32, 33, 34, and is adapted for simultaneous intermittent switching of the connection between all of the N outlet lines with all of the P inlet lines, to sequentially provide N different possible inlet/outlet patterns.

If the gas flow direction is reversed, then said P inlet lines of the first distribution device 2 will become outlet lines, and said N outlet lines will become inlet lines.

A second fluid flow distribution device 6, with no mixing feature, is also provided, which has a plurality N of inlet lines 71, 72, 73, 74, 75, 76, 77, 78 and a plurality P of outlet lines 81, 82, 83, 84 where $N \geq P$.

The second distribution device 6 selectively connects each inlet line 71, 72, 73, 74, 75, 76, 77, 78 to one outlet line 81, 82, 83, 84, and is adapted for simultaneous intermittent switching of the connection between all of the N inlet lines with all of the P outlet lines, to sequentially provide N different possible inlet/outlet patterns.

If the gas flow direction is reversed, then said N inlet lines of the second distribution device 6 will become outlet lines, and said P outlet lines will become inlet lines.

A plurality of stationary process chambers 51, 52, 53, 54, 55, 56, 57, 58 is also provided, see FIG. 1B, each of which is in communication with one outlet line 41, 42, 43, 44, 45, 46, 47, 48 of the first distribution device 2 and with one inlet line 71, 72, 73, 74, 75, 76, 77, 78 of the second distribution device 6.

The N process chambers 51, 52, 53, 54, 55, 56, 57, 58, preferably provided in superimposed arrangement, are adapted to contain a granular adsorbent material, such as macroporous resins, adsorbent carbons or other molecular sieves.

The first and second distribution devices 2, 6 synchronously cooperate to simultaneously and separately distribute a plurality of gas flows P to said process chambers, through N possible paths.

Figure 2:
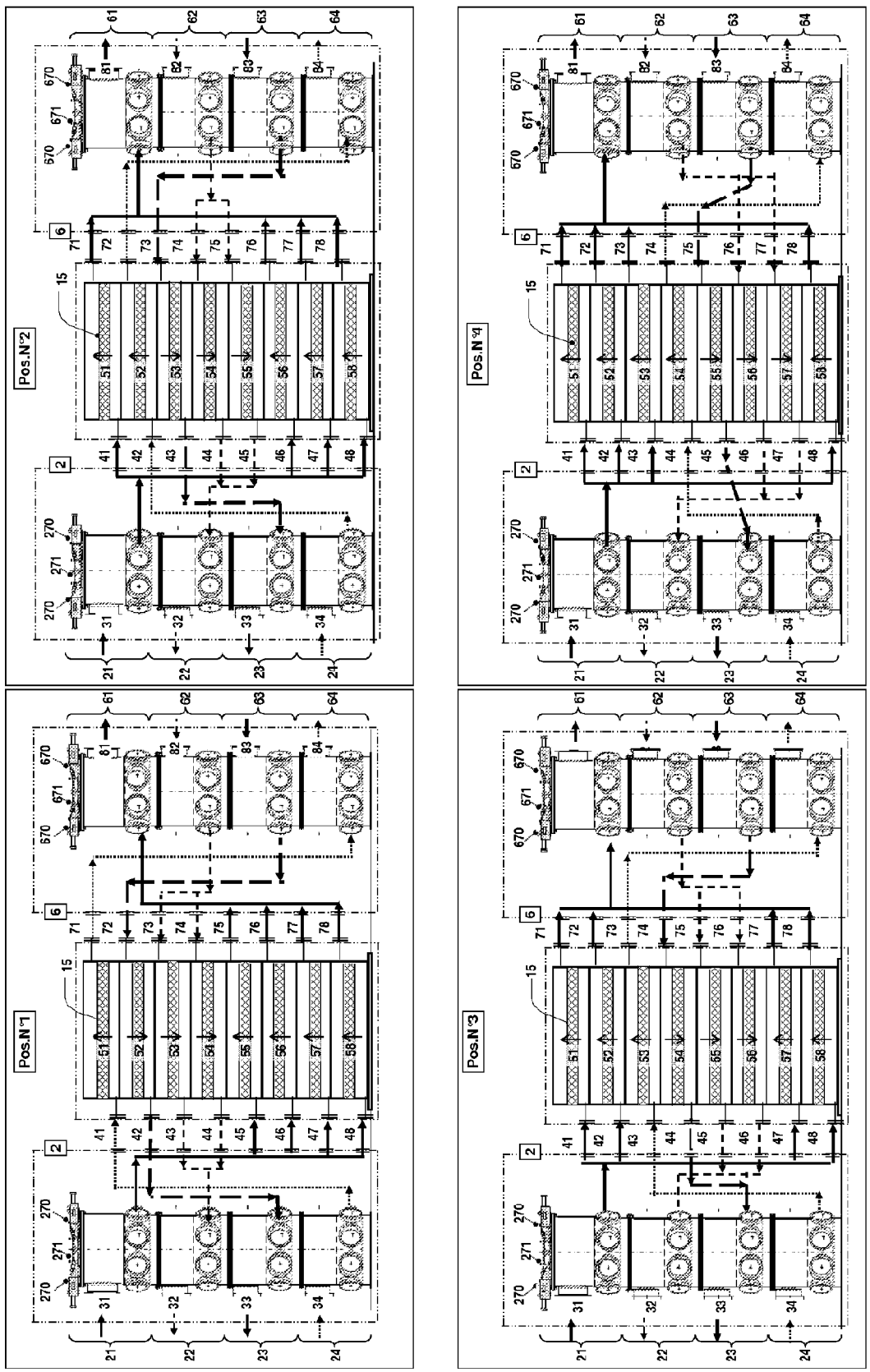
FIGS. 2 and 2A show a cyclic sequence of gas flow path patterns in a process including adsorption, primary desorption, secondary desorption, cooling.
Figure 2A:
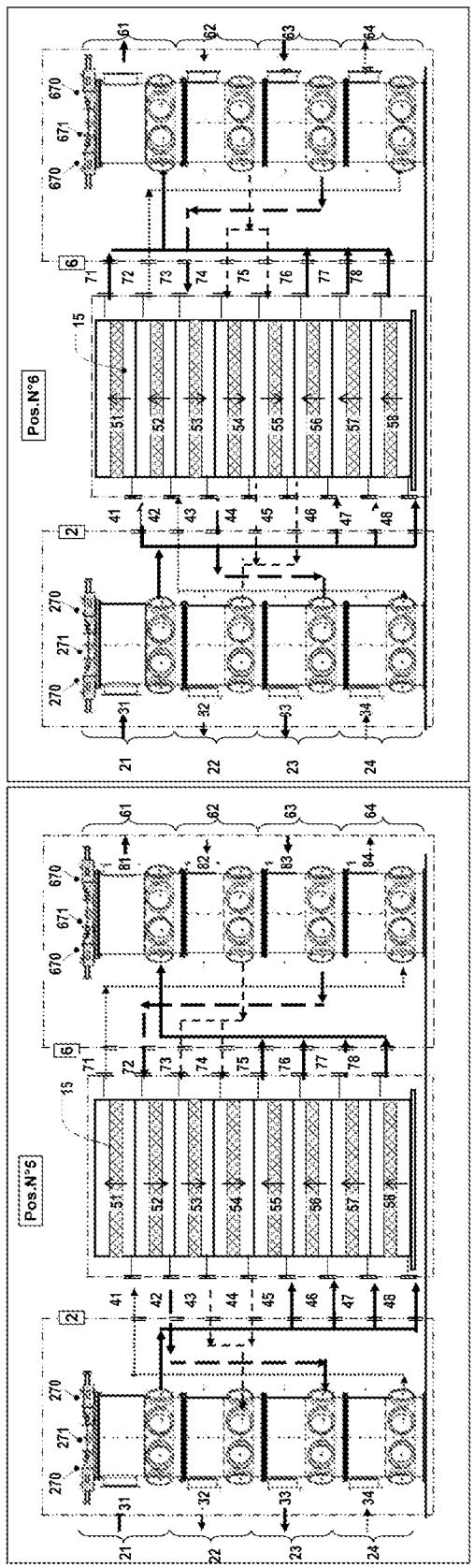
Figure 2A:
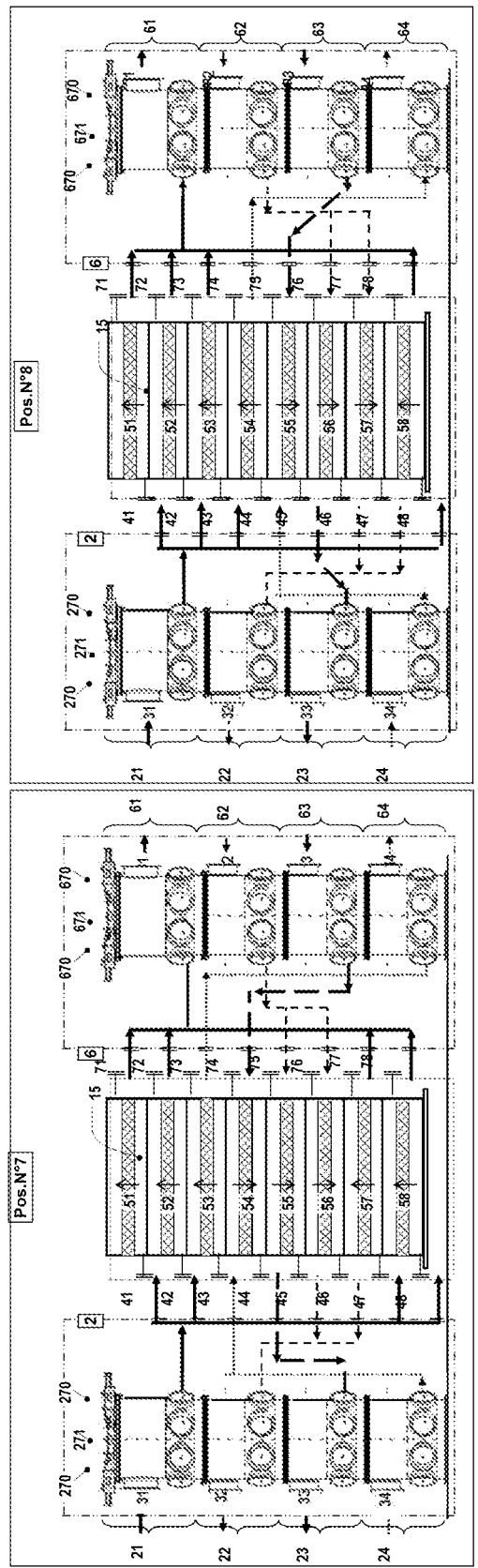

FIGS. 2 and 2A show a cyclic sequence of the N gas flow path patterns for the process, with reference to the special case in which P=4 and N=8.

Figure 3:
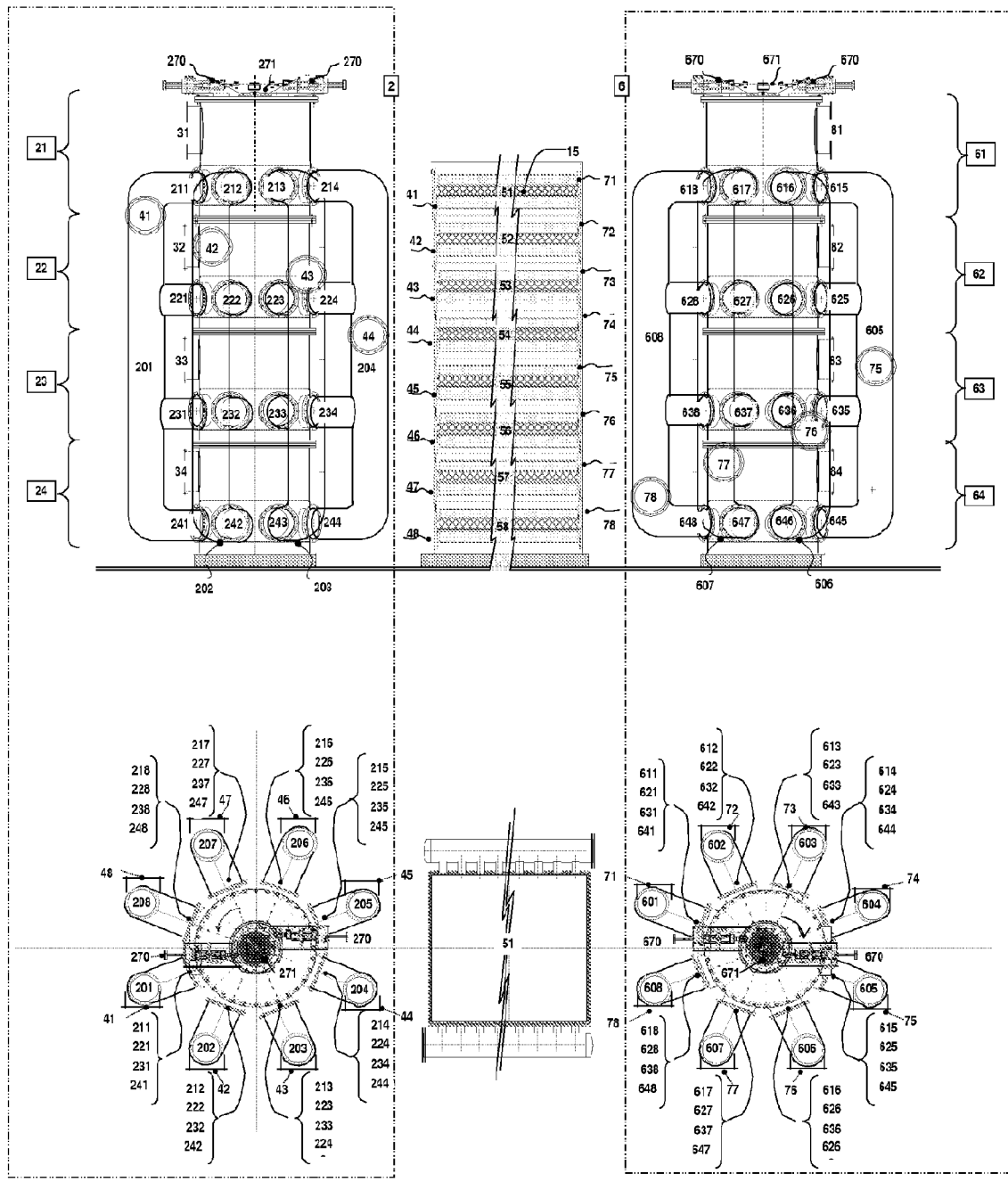
FIG. 3 contains schematic front and top views of the distribution devices (2) and (6), with no mixing feature, for distributing fluid flows to the process chambers.
Figure 4:
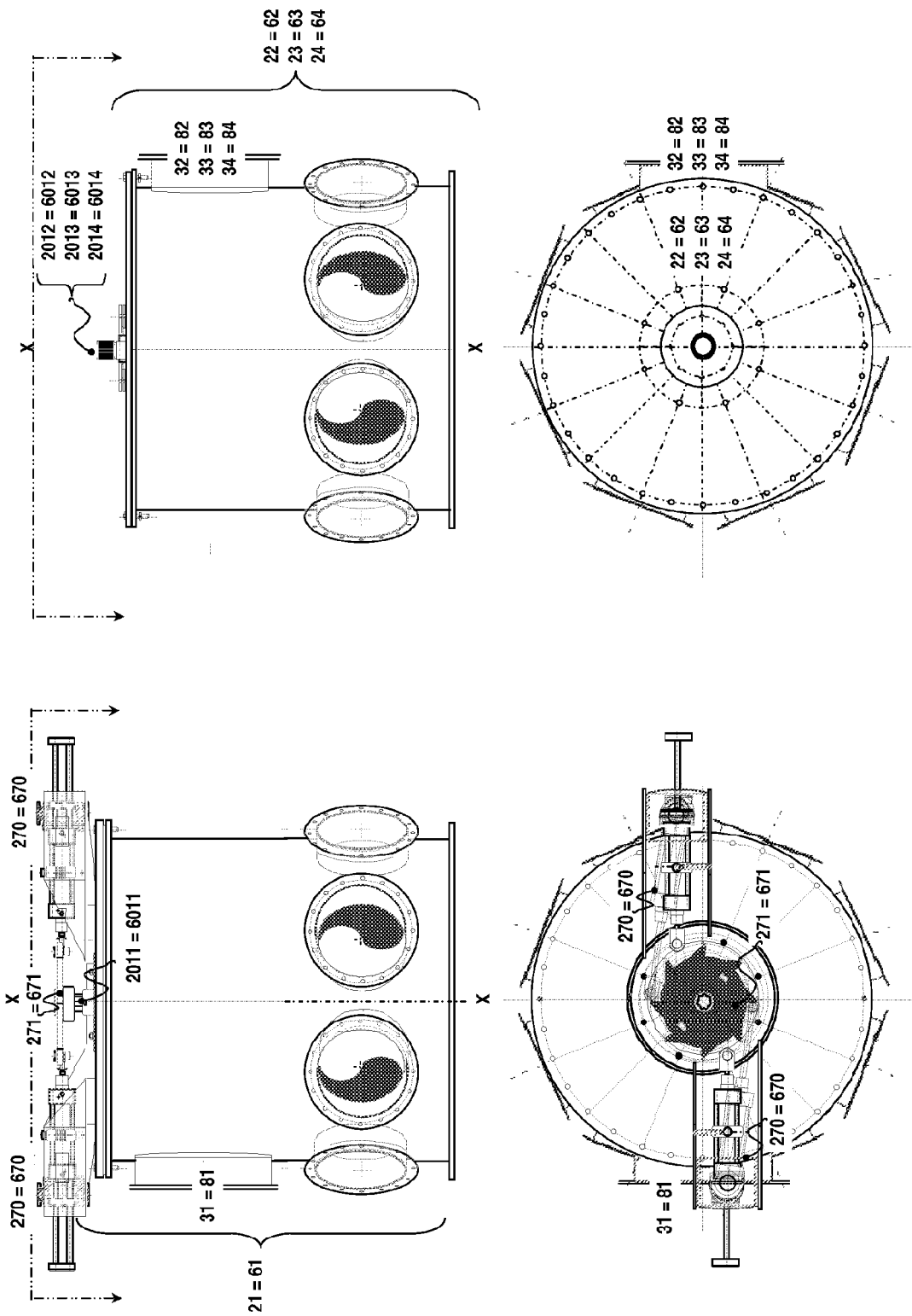
FIG. 4 is an exterior view of two types of modules (valves) that are part of the distribution devices of FIG. 10.
Figure 5:
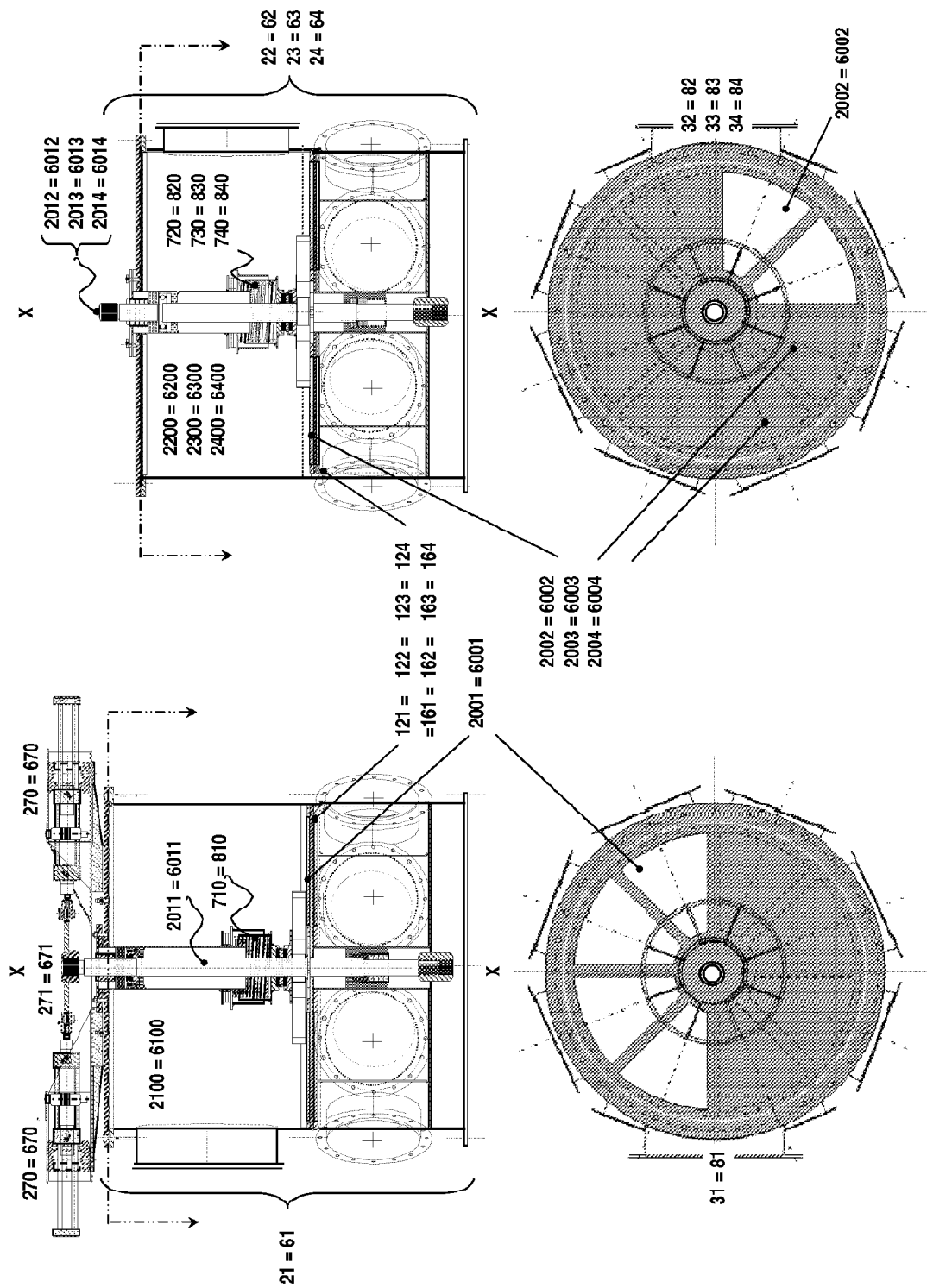
FIG. 5 is a front sectional view of the modules of FIG. 11.

In this possible embodiment, the first fluid flow distribution device 2 comprises a plurality P of distribution valves (or modules) 21, 22, 23, 24 each having a cylindrical wall, and being delimited by upper and lower flat covers, which are separate and removable from each other, but functionally integrated and synchronized with each other (see FIGS. 3, 4 and 5).

Each distribution valve of the distribution device 2 has one inlet 31 or 32 or 33 or 34 and respectively N outlets 211, 212, 213, 214, 215, 216, 217, 218 or 221, 222, 223, 224, 225, 226, 227, 228 or 231, 232, 233, 234, 235, 236, 237, 238 or 241, 242, 243, 244, 245, 246, 247, 248.

N vertical outlet manifolds 201, 202, 203, 204, 205, 206, 207, 208 are also provided downstream from the P distribution valves (see FIGS. 1 and 1A), each being in communication with one of the N outlets of each distribution module 21, 22, 23, 24.

Each outlet manifold has one outlet line 41, 42, 43, 44, 45, 46, 47, 48 connected with one of the process chambers 51, 52, 53, 54, 55, 56, 57, 58.

If the gas flow direction is reversed, then said inlets will become outlets, and said vertical outlet manifolds will become inlet manifolds.

The second distribution device 6 has a plurality P of distribution valves 61, 62, 63, 64 having the same construction as the valves of the distribution device 2, and also functionally integrated and synchronized with each other.

Each distribution valve has N inlets 611, 612, 613, 614, 615, 616, 617, 618 or 621, 622, 623, 624, 625, 626, 627, 628 or 631, 632, 633, 634, 635, 636, 637, 638 or 641, 642, 643, 644, 645, 646, 647, 648 and respectively one outlet 81 or 82 or 83 or 84.

N inlet manifolds 601, 602, 603, 604, 605, 606, 607, 608 are also provided upstream from the P distribution valves.

Each inlet manifold has one outlet line 71, 72, 73, 74, 75, 76, 77, 78 connected with one of the process chambers 51, 52, 53, 54, 55, 56, 57, 58.

Each inlet manifold 601, 602, 603, 604, 605, 606, 607, 608 is in communication with one inlet of each distribution valve 61, 62, 63, 64.

If the gas flow direction is reversed, then what was noted about the distribution device 2 also applies to the second distribution device 6, thence said inlets will become outlets, and said vertical inlet manifolds will become outlet manifolds.

In the illustrated embodiment, each of the two fluid flow distribution devices 2, 6 has a plurality P of plugs 2001, 2002, 2003, 2004; 6001, 6002, 6003, 6004 (see FIGS. 6 and 6A) which are adapted to intermittently rotate about the same axis X, X' and are driven by a drive system controlled by a single motor 270, 670.

Figure 6:
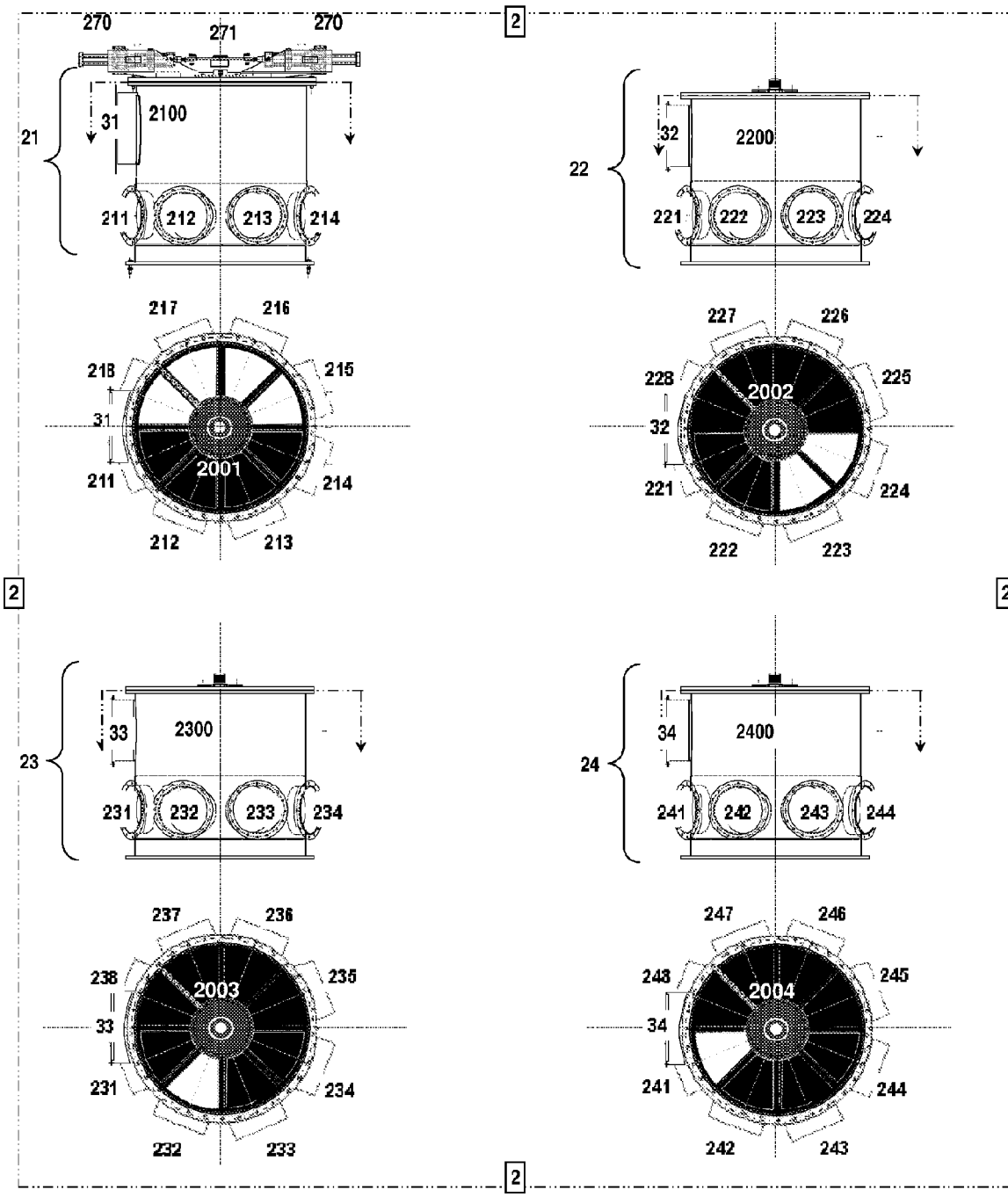
Figure 6:
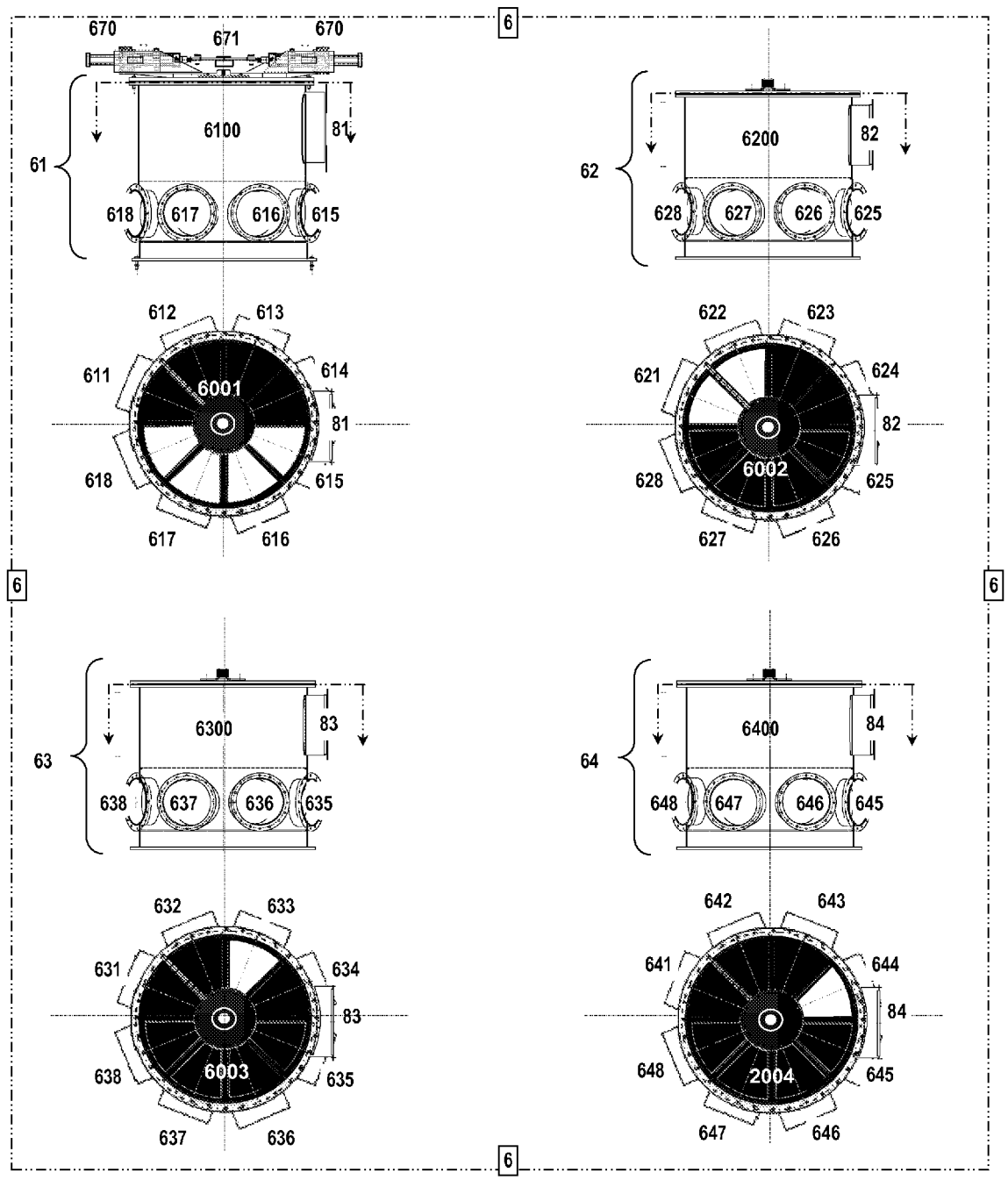

In one preferred embodiment, the plugs of the distribution devices 2, 6 may be driven by pairs of pneumatic actuators 270, 670 which cooperate with a ratchet 271, 671 for plug rotation to occur in one direction only (see FIGS. 6 and 6A).

Figure 7:
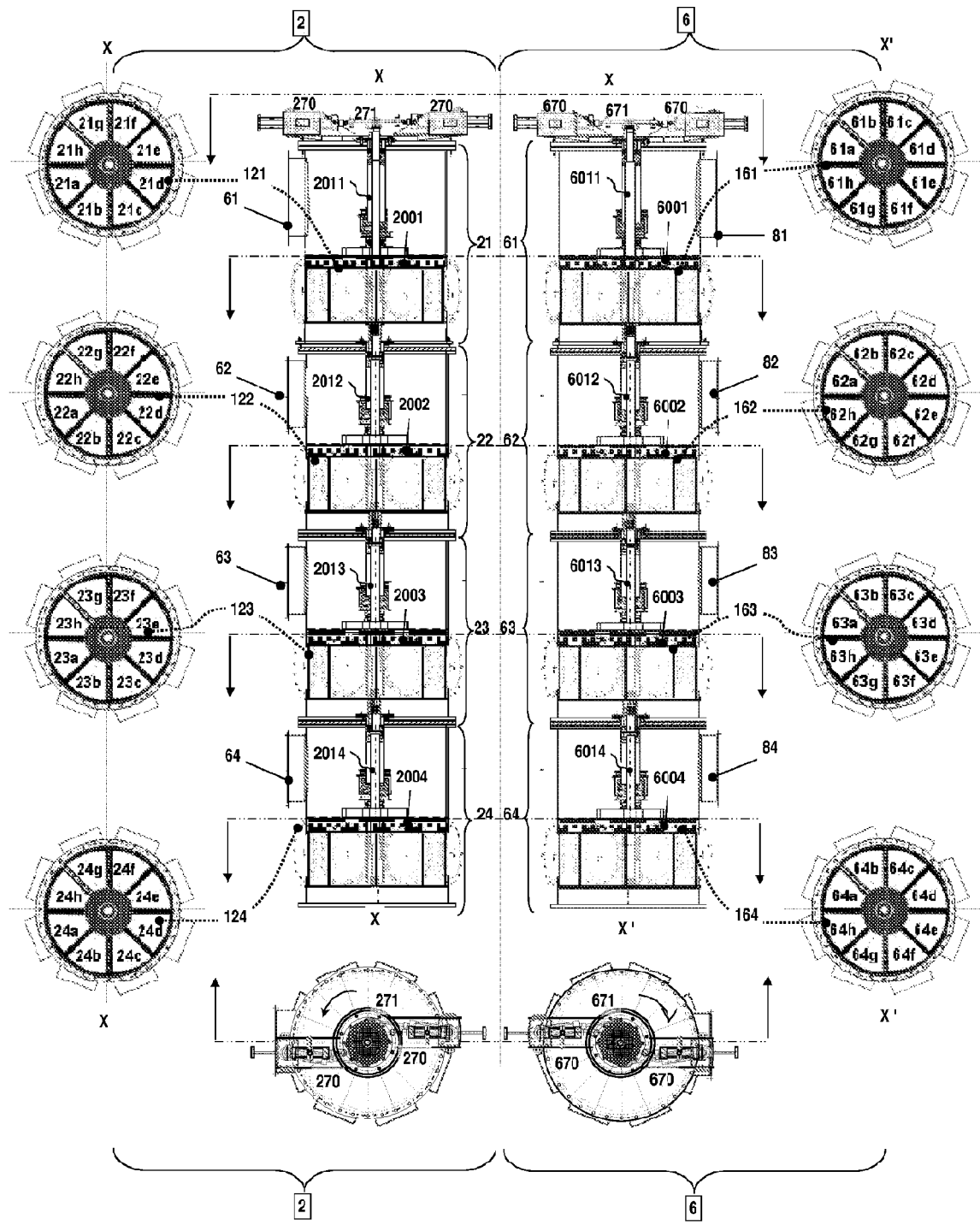
FIG. 7 shows, next to its sectional views, a top view as taken in each of the modules of FIG. 11 belonging to the distribution devices (2) and (6), showing the pattern of diaphragms or flat walls and corresponding ports.

In the illustrated embodiment, each distribution valve 21, 22, 23, 24; 61, 62, 63, 64 of the first and second distribution devices 2, 6 has (see FIG. 5) a diaphragm or flat wall 121, 122, 123, 124; 161, 162, 163, 164, with a plurality N of ports 21a, 21b, 21c, 21d, 21e, 21f, 21g, 21h; 22a, 22b, 22c, 22d, 22e, 22f, 22g, 22h; 23a, 23b, 23c, 23d, 23e, 23f, 23g, 23h; 24a, 24b, 24c, 24d, 24e, 24f, 24g, 24h; 61a, 61b, 61c, 61d, 61e, 61f, 61g, 61h; 62a, 62b, 62c, 62d, 62e, 62f, 62g, 62h; 63a, 63b, 63c, 63d, 63e, 63f, 63g, 63h; 64a, 64b, 64c, 64d, 64e, 64f, 64g, 64h formed therein (see FIG. 7).

Each plug 2001, 2002, 2003, 2004; 6001, 6002, 6003, 6004 is capable of slipping along the flat wall 121, 122, 123, 124; 161, 162, 163, 164 to selectively close at least one of the ports in the wall.

Seal means are also provided between each plug and each flat wall along which the plug slips.

In one possible embodiment, the seal means, which have holes like the flat walls on which they lay, are made of a polytetrafluoroethylene-based layer.

In the illustrated embodiment, the N ports of each diaphragm or flat wall are disposed in star arrangement about the axis of rotation X, X' of the plugs.

Figure 8:
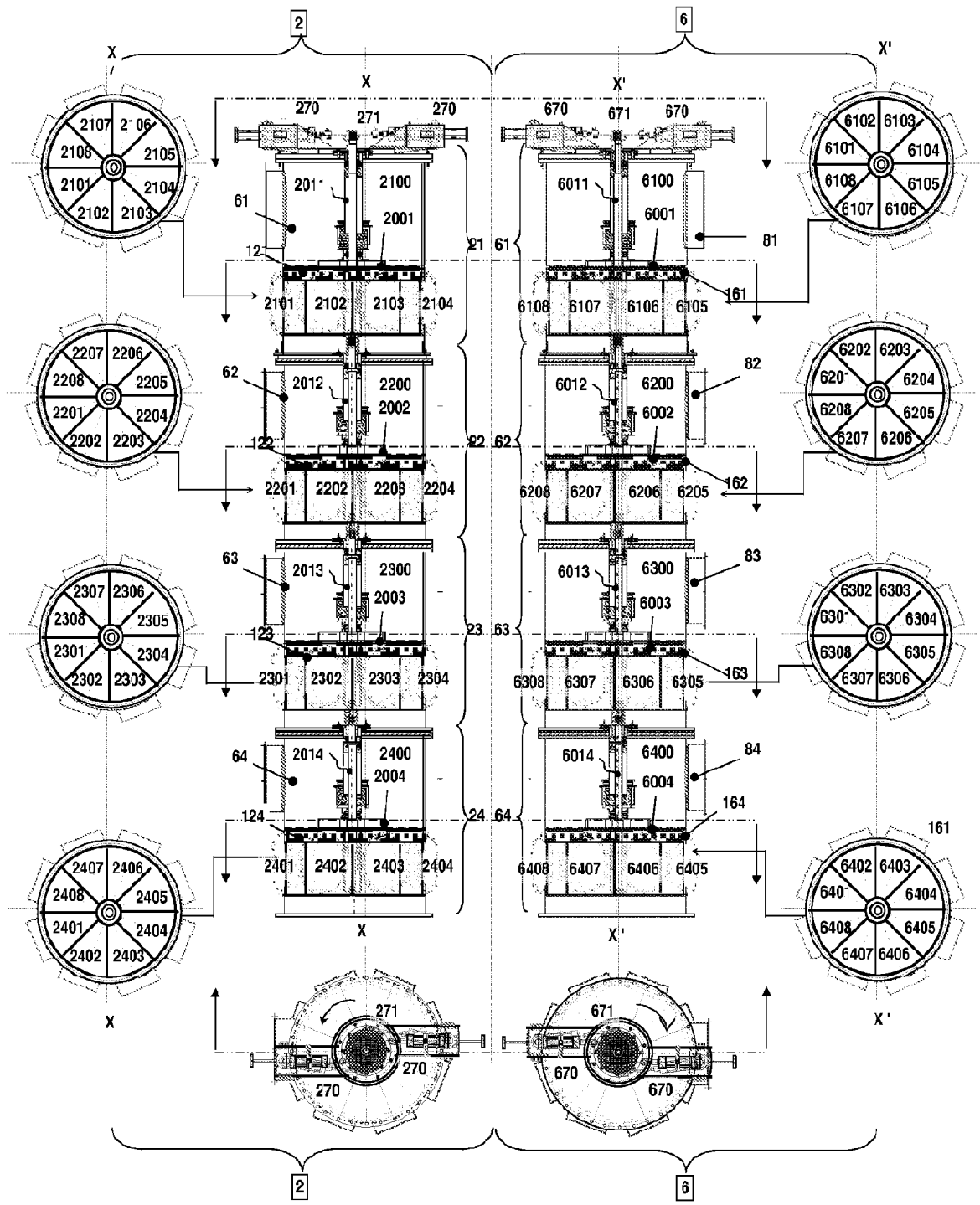
FIG. 8 shows, next to its sectional views, a top view as taken in each of the modules of FIG. 4 belonging to the distribution devices (2) and (6), showing the pattern of the lower chambers of said modules.

In the illustrated embodiment, each distribution valve of the first distribution device 2 has (see FIG. 8) one upper chamber 2100, 2200, 2300, 2400, delimited at its top by a flat cover, and a plurality of N of lower chambers 2101, 2102, 2103, 2104, 2105, 2106, 2107, 2108; 2201, 2202, 2203, 2204, 2205, 2206, 2207, 2208; 2301, 2302, 2303, 2304, 2305, 2306, 2307, 2308; 2401, 2402, 2403, 2404, 2405, 2406, 2407, 2408, delimited at the bottom by a flat cover and at the sides by flat vertical walls, and separated from the upper chamber by the wall 121, 122, 123, 124 with the ports, on which the corresponding plug 2001, 2002, 2003, 2004 slips.

Each distribution valve of the second distribution device 6 has (see FIG. 8) one upper chamber 6100, 6200, 6300, 6400, delimited at its top by a flat wall, and a plurality of N of lower chambers 6101, 6102, 6103, 6104, 6105, 6106, 6107, 6108; 6201, 6202, 6203, 6204, 6205, 6206, 6207, 6208; 6301, 6302, 6303, 6304, 6305, 6306, 6307, 6308; 6401, 6402, 6403, 6404, 6405, 6406, 6407, 6408, delimited at the bottom by a flat wall and at the sides by flat vertical walls, and separated from the upper chamber by a flat wall 161, 162, 163, 164 with the ports, on which the corresponding plug 6001, 6002, 6003, 6004 slips.

Depending on fluid flow direction, the upper and lower chambers act as inlet or outlet chambers relative to the individual valves of the distribution devices 2, 6.

In one possible embodiment, the first and second distribution devices 2, 6 have a generally tubular body, extending along the axis of rotation X, X', which defines the side wall of the distribution valves.

Preferably, the plugs 2001, 2002, 2003, 2004; 6001, 6002, 6003, 6004 are driven (see FIG. 8) by a plurality of coaxial shafts 2011, 2012, 2013, 2014; 6011, 6012, 6013, 6014, which are joined together by removable joints, for synchronous plug motion.

For an improved sealing action between the plugs and the walls in mating relationship with the plugs, elastic means are provided, for pressing the plugs against the corresponding flat walls.

Figure 9:
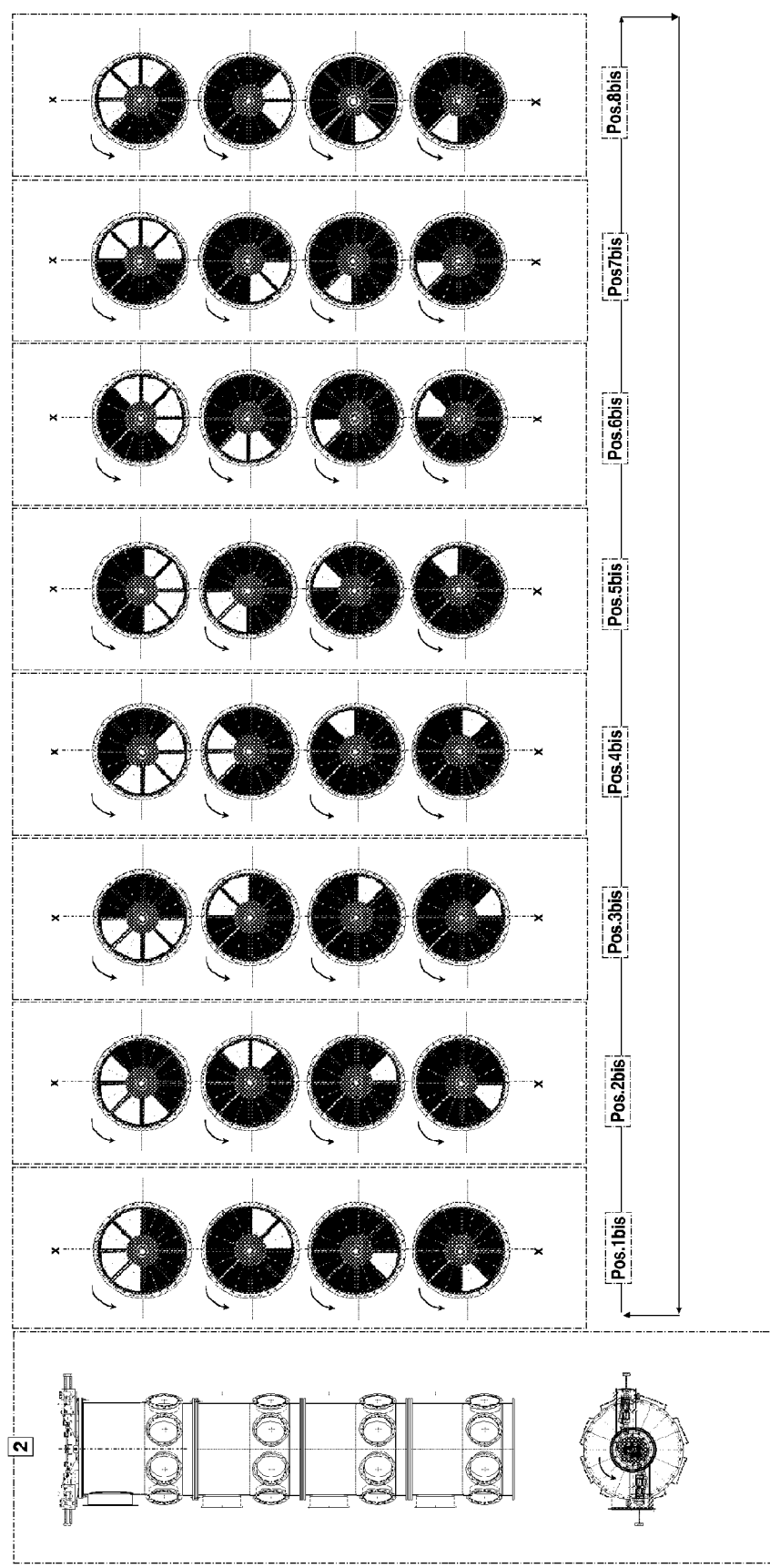
FIG. 9 shows the position of the plugs in the four modules for each of the eight switching patterns provided by the distribution device (2)

The positions of the plugs in each of the modules that form the distribution devices 2 and 6, during the various process steps are shown in FIGS. 9 and 9A.

In the illustrated embodiment, the N process chambers 51, 52, 53, 54, 55, 56, 57, 58, contain a non-cohesive or granular material with adsorbent properties, such as macroporous resins or activated carbons with low ash content.

The non-cohesive adsorbent material is retained by opposed meshes, preferably of rep type (a wire cloth generally with warp and weft wires of different diameters) supported by grids to withstand the thrust of the gases that pass through the process chambers.

The provision of two opposed meshes allows gas speed to be increased.

Rep cloths are less subjected to clogging.

In a possible embodiment, each process chamber substantially and/or generally has the shape of a parallelepiped.

Each pair of plenums associated with one chamber communicates with the outlet manifolds 201, 202, 203, 204, 205, 206, 207, 208 and the inlet manifolds 601, 602, 603, 604, 605, 606, 607, 608.

Due to the combined and synergetic action of the pair of special distribution devices 2 and 6 and the N process chambers, the apparatus as disclosed herein can convey and shut off P×N fluid flows, while keeping them apart and free of any mutual contamination, in either direction, as required in each particular application.

In the embodiment as described herein, the distribution devices 2 and 6 are provided instead of sixty-four perfectly tight conventional valves with their respective passage lines, which might be otherwise required for distributing and shutting off the P flows for a complex adsorption process with N process chambers.

In one possible use of the apparatus, the adsorbent material 15 contained in each chamber 51, 52, 53, 54, 55, 56, 57, 58 may sequentially undergo the steps if adsorption, primary desorption, secondary desorption and cooling.

The apparatus is preferably made of metal, excepting the gasket and seal materials.

In the illustrated embodiment, the number of process chambers N is 8 and the number P of inlet lines to the first distribution device 2 and the number P of outlet lines from the second distribution device is 4.

DESCRIPTION OF THE METHOD

Therefore, the above apparatus may be used for implementing a method that involves parallel and simultaneous occurrence of a plurality P of physical processes on a plurality N of fluid flows, where N≧P, which includes the steps of:
- distributing, without mixing, a plurality P of first fluid flows among a plurality N of second fluid flows;
- using each of said second fluid flows for carrying out one of said P physical processes;
- distributing, without mixing, said plurality N of second fluid flows among a third plurality P of fluid flows;
- simultaneously and intermittently switching the distribution of said first plurality and said third plurality of fluid flows P and said second plurality N of fluid flows, to cyclically sequentially assume N possible distribution patterns of said plurality N of second fluid flows.

This will particularly provide an effective method for purifying a gas flow, characterized by high flow rate and low pressure and containing organic or inorganic volatile compounds even at high concentrations.

In principle, this method also includes the parallel and simultaneous steps of distributing, without mixing and with no mutual contamination:
- an adsorption flow,
- at least one closed-circuit primary desorption flow,
- an open-circuit secondary (or finishing) desorption flow,
- a cooling flow,
- to a plurality N of stationary process chambers containing beds of adsorbent material, for simultaneously carrying out an adsorption step, at least one closed-circuit primary desorption step, a secondary desorption step and a cooling step.

In accordance with this method, the compounds that are originally present in a concentration of less than 0.25 LEL (Lower Explosion Limit) in the primary flow that comes into the adsorption chambers, where they are almost entirely adsorbed, are removed therefrom by being quantitatively transferred to a secondary flow, having a 100-300 times lower flow rate, generated during the desorption process, in which these compounds are consequently present at very high concentrations, and which must be inert to ensure that its oxygen concentration is lower than the minimum explosion-inducing concentration (LOC, Limiting Oxygen Concentration) thereby preventing any safety problem beforehand.

For this purpose, a nitrogen gas flow must be used, which is introduced into the desorption circuits, at an adequate heating temperature to provide the energy required for desorption and appropriately conveyed through the chambers to sequentially provide the circuits and desorption steps according to the above described steps.

With this method, the number of process chambers where adsorption takes place is greater than the number of process chambers where desorption takes place and the number of process chambers where desorption takes place is greater than the number of process chambers where cooling takes place.

Also, the number of process chambers for the cooling step is equal to or greater than the number of process chambers for the secondary desorption step.

The distribution of adsorption, primary desorption, secondary desorption and cooling flows is cyclically changed through N possible patterns.

Preferably, the desorption flows are countercurrent to the adsorption flow and the cooling flow is equicurrent thereto.

The above mentioned steps are simultaneously carried out in different process chambers and synchronously follow their sequence in each process chamber, so that each chamber cyclically undergoes the same succession of operating steps.

Figure 10:
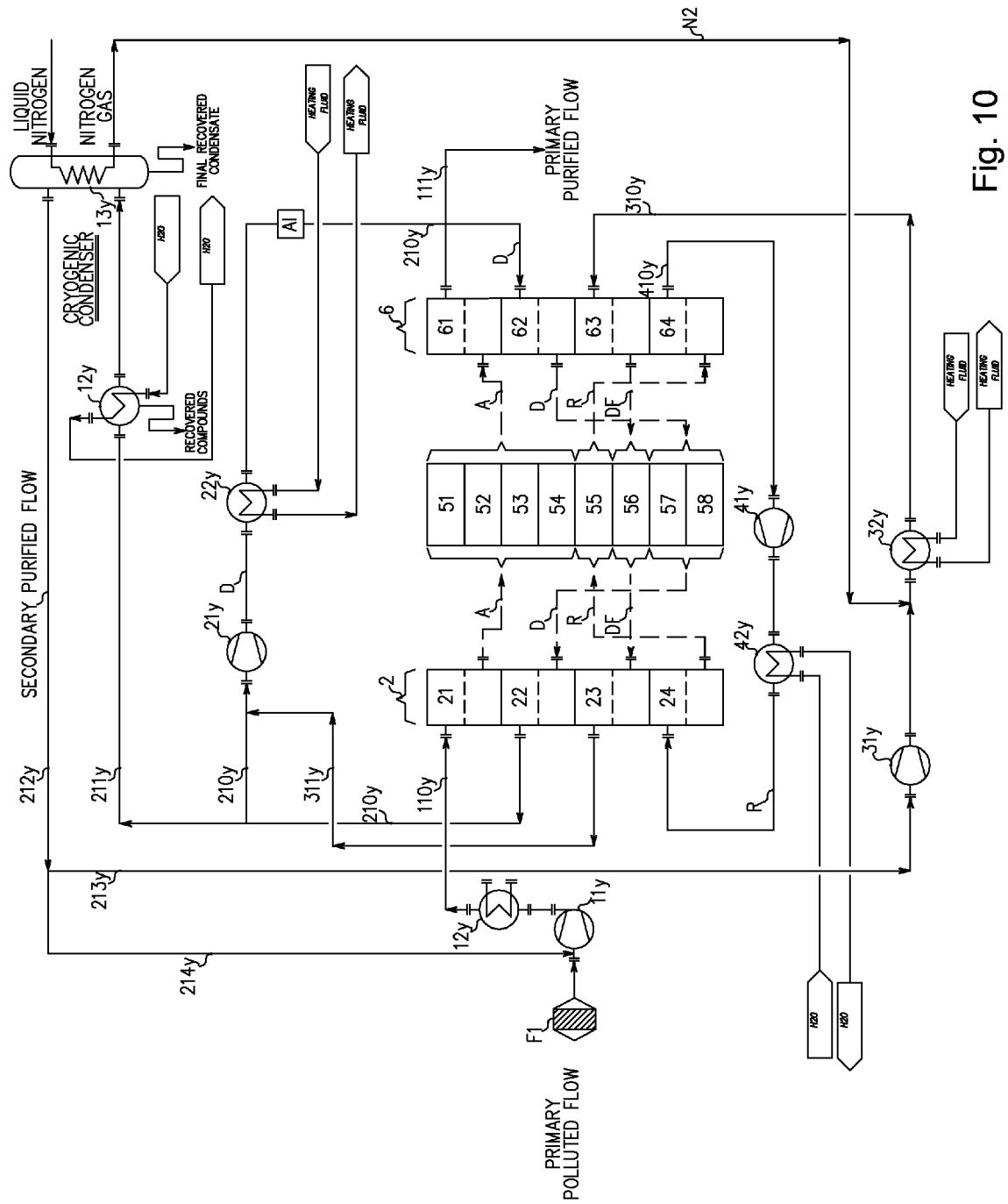
FIG. 10 shows an exemplary application of the apparatus of FIG. 1 for ensuring separation of volatile compounds and recovery thereof by condensation, using the inventive method.

Referring to FIG. 10, this method is described in its application to purification of a gas flow 110y having the above mentioned characteristics, wherein part of the adsorbent material is used to adsorb the compounds in the flows, whereas the rest of the material simultaneously and sequentially undergoes one closed-circuit primary desorption step and one open-circuit secondary desorption step, for regenerating the material and quantitatively recovering the adsorbed compounds in the form of an inert gas mixture having a low flow rate and a very high concentration, and a final cooling step, which is designed to make the adsorbent bed ready for continuing the process.

In the described case, the plurality P of process steps P are 4 and the plurality of fluid flows N are 8, and the description of a possible second closed-circuit primary desorption step is omitted, for simplicity.

The method requires the provision of beds of adsorbent material 15, which are retained by parallel opposed meshes, preferably of rep type, supported by grids, which beds are contained in central positions in a plurality of stationary process chambers 51, 52, 53, 54, 55, 56, 57, 58, preferably in superimposed arrangement, in which all the process steps are cyclically and simultaneously carried out.

In the configuration of FIG. 10, the chambers 51-54 are used for adsorption, the chambers 57 and 58 for primary desorption, the chamber 56 for secondary desorption and the chamber 55 for cooling.

The passage from one configuration to the other, at predetermined time intervals, shall occur intermittently in a fraction of a second, typically 0.2-0.3 s, for minimizing mutual flow contamination.

The flows are fed to the process chambers by two mutually cooperating distribution devices 2 and 6, each composed of four physically separated but interconnected and interdependent operating modules, each designed for a particular process step: adsorption 21 and 61, primary desorption 22 and 62, secondary desorption 23 and 63, cooling 24 and 64.

The movements of the two distribution devices 2 and 6 are symmetrical and synchronized.

Furthermore, connection means are provided for completing and/or closing the circuits required for the implementation of the method, ventilation means and flow heating and cooling means.

The module 21 receives an external flow 110y containing the compounds to be separated, which flow is forced by the fan 11y, and pre-filtered and cooled if needed, through the filter F1 and the heat exchanger 12y, and divides it into four flows A, which are fed to the chambers in which the adsorption step takes place (51, 52, 53, 54 in the illustrated configuration).

The four purified flows that come out of these chambers are transferred to the module 61, where they are combined and discharged to the atmosphere, as a primary purified effluent 111y.

In the same instantaneous configuration of this figure, the chambers 57 and 58, that were first used for adsorption, are now used for primary desorption of the adsorbed compounds.

For the primary desorption step, which is carried out by circulation of inert fluid in a closed circuit 210y using a fan 21y and a heat exchanger 22y for heating to an effective temperature, the modules 22 and 62 are used for properly conveying the flows D to the beds 57 and 58, countercurrent to the flows A of the previous adsorption step.

As a fluid for primary desorption, the method provides the use of the inert gas flow 311y generated by the secondary desorption step, which is introduced at an appropriate location of the primary desorption circuit, preferably upstream from the fan 21y.

Oxygen concentration in the circuit D is continuously monitored by the analyzer device AI.

In this method, the primary desorption circuit D is caused to continuously release the inert flow 211y containing the desorbed compounds, which is introduced into a system of heat exchangers 12y to undergo therein a number of successive cooling steps using less valuable cooling fluids, such as tower water and chilled water, for progressively condensing and recovering the compounds until quantitative separation thereof in the final cryogenic stage 13y, with energy recovery, which stage uses liquid nitrogen and evaporates it into pressurized nitrogen gas N2, required for the method.

The secondary desorption used in this method for removing the residual amounts of compounds that have been left in the chamber 56 in the previous step, is carried out in a single step in this chamber, countercurrent to the adsorption flow, by injecting the continuous flow of pure nitrogen gas N2 produced in the special cryogenic exchanger 13y through the module 63.

Such flow N2, previously heated to the desorption temperature in the exchanger 32a, forms the base of the flow 310y that is used for secondary desorption and then for primary desorption.

Then the module 23 conveys the flow 311y from the chamber 56 to the line for connection to the desorption circuit 210y, as described above.

The flow 211y that comes out of the circuit 210y, at the outlet of the cryogenic exchanger, is a substantially pollutant-free inert effluent 212y.

According to the method, a larger part of the flow 212y is used for making the two successive desorption steps more effective by combining it with the flow N2 using a fan 31y, so that the flow 310y is equal to the sum of 213y and N2.

The rest of the flow 212y, designated as 214y, whose amount corresponds to the flow N2 entering the system may be easily added to the incoming flow to the adsorption station upstream from the fan 11y.

Typically, the ratio of the flow rate of the secondary effluent 214y, and hence the flow rate of the flow N2 to the flow rate of the gas flow 110y is 1:300 to 1:100, whereas the concentration of volatile compounds in the flow 211y that comes out of the primary desorption circuit increases relative to said flow 110y in inverse proportion to their respective flow rates.

The bed of the chamber 55, which is still hot as a result of the desorption steps that have been carried out therein, has to be cooled to a temperature adapted for subsequent adsorption use.

For the chamber cooling step, which is carried out by circulation of inert fluid in a closed circuit 410y having a fan 41y and a cooler 42y for cooling the circulating fluid, the modules 24 and 64 are used for properly conveying the flow R to the bed, equicurrent to the flow A of the adsorption step.

In particular complex cases, which are not considered in the above description for simplicity, the method provides at least one second closed-circuit primary desorption step between the two above steps, which is carried out by interposing two identical valves 22 bis and 62 bis between the valves 22 and 24 of the distribution device 2 and between the valves 62 and 64 of the distribution device 6 respectively and by completing the circuit, including the upstream and downstream connections and the means required for handling and heating the added flow.

In this case, the plurality P of physical processes are 5 and the plurality of fluid flows N are 8 or more.

Essential conditions for fulfilling the purposes of the method are perfect synchronism of the process steps and perfect separation of process flows, to avoid any mutual contamination.

These conditions are fulfilled by providing a pair of special distribution devices 2 and 6 which replace, in the example described herein, sixty-four perfectly tight conventional valves p which would be otherwise required for distributing and shutting off the eight flows, as provided by the method in this case.

This obviates the risk, highly probable when using so great a number of valves, that an occasional failure of even one of the sixty-four elements, might cause crossed contamination of process flows.

Another essential condition for the method, i.e. the preservation of non-explosive conditions of the gas mixtures in the circuits, is fulfilled by using the nitrogen gas generated for the final step of condensation and recovery of the desorbed compounds, which maintains oxygen at concentrations lower than the LOC in such mixtures and lower than 0.25 LEL in the other process flows.

An additional requirement is consistency (in terms of duration and simultaneity) of the times required for complete execution of each process step, notwithstanding that their duration shall be minimized for ensuring efficiency of the whole process.

This condition is fulfilled by balancing the sizes of the adsorbent beds (thickness and passage area) and the number of stationary chambers in which the steps are successively carried out, by optimizing the chemical and physical parameters of the process (flow rates of primary and secondary desorption flows and the cooling flow, heating and cooling temperatures, contact times, duration of the operating steps and the cycle), based on adsorption and desorption isotherms and using adsorbent materials having special characteristics.

Typically the contact time of the flows in the adsorbent beds may be 0.1 s to 0.5 s.

Typically, the duration of each operating step is 3 to 7.5 minutes and the duration of an entire cycle is 24 to 60 minutes, which durations may be extended or shortened as needed.

Optimized efficiency of the method is obtained by using an adsorbent material having such characteristics as to ensure easy, effective and high-yield adsorption and equally easy desorption, to be substantially free of adsorbed compounds at the ends of the desorption steps.

Particularly, the method provides the use of macroporous resins with a styrene-divinylbenzene structure, which have the most favorable properties in view of reaching the above purposes, in that they have low adsorption and desorption heat due to their hydrophobicity and total absence of catalysis sites, have very short contact times for adsorption, with high adsorption yields, ensure a quasi quantitative desorption in very short times and at definitely lower temperatures due to their chemical and morphological structure and have a mechanical and thermal shock resistant structure.

In certain cases, the method alternatively provides the use of activated carbons in the form of small-diameter spherules derived from pitch residues of oil distillation, with a very low ash content and a mixed macro-mesoporous internal structure, also having similarly suitable properties, although to a lower degree.

These activated carbons, which are characterized by an even higher adsorption coefficient, may be preferred in cases of little or no humidity in the flows to be treated, to comply with the tendency of carbons to absorb water.

For certain polluting compounds, characterized by a higher boiling point or difficult adsorption on macroporous resins, the method provides the use of small-sized extruded activated carbons of fossil origin, zeolites or other types of molecular sieves, in which case the primary and secondary desorption temperature will be necessarily higher.

The apparatus and method as disclosed herein provides an adsorption technology adapted for treatment of industrial emissions with the primary purpose of recovering a very wide range of organic and inorganic compounds of industrial interest, also gases, while obviating prior art problems and particularly the above mentioned construction and operation drawbacks.

As compared with the prior art, the novel technology provides the following advantages:
  any regulatory restrictions concerning the emissions of such compounds may be met;
  lower investment and operating costs;
  smaller installation area requirements;
  consistent consumption of utilities, with no consumption peaks;
  higher operating safety;
  higher recovery yield and better quality of separate compounds;
  no need for further downstream purification technologies, unlike rotary adsorbers/concentrators, which usually require a final fixed-bed system;
  use of a valuable energy resource, i.e. liquid nitrogen, is combined with the solution of operating safety problems by compliance with LOC (Limiting Oxygen Concentration);
  highly versatile use, with cycles of varying duration, to face significant changes of flow rates and pollutant concentrations.

Figure 11:
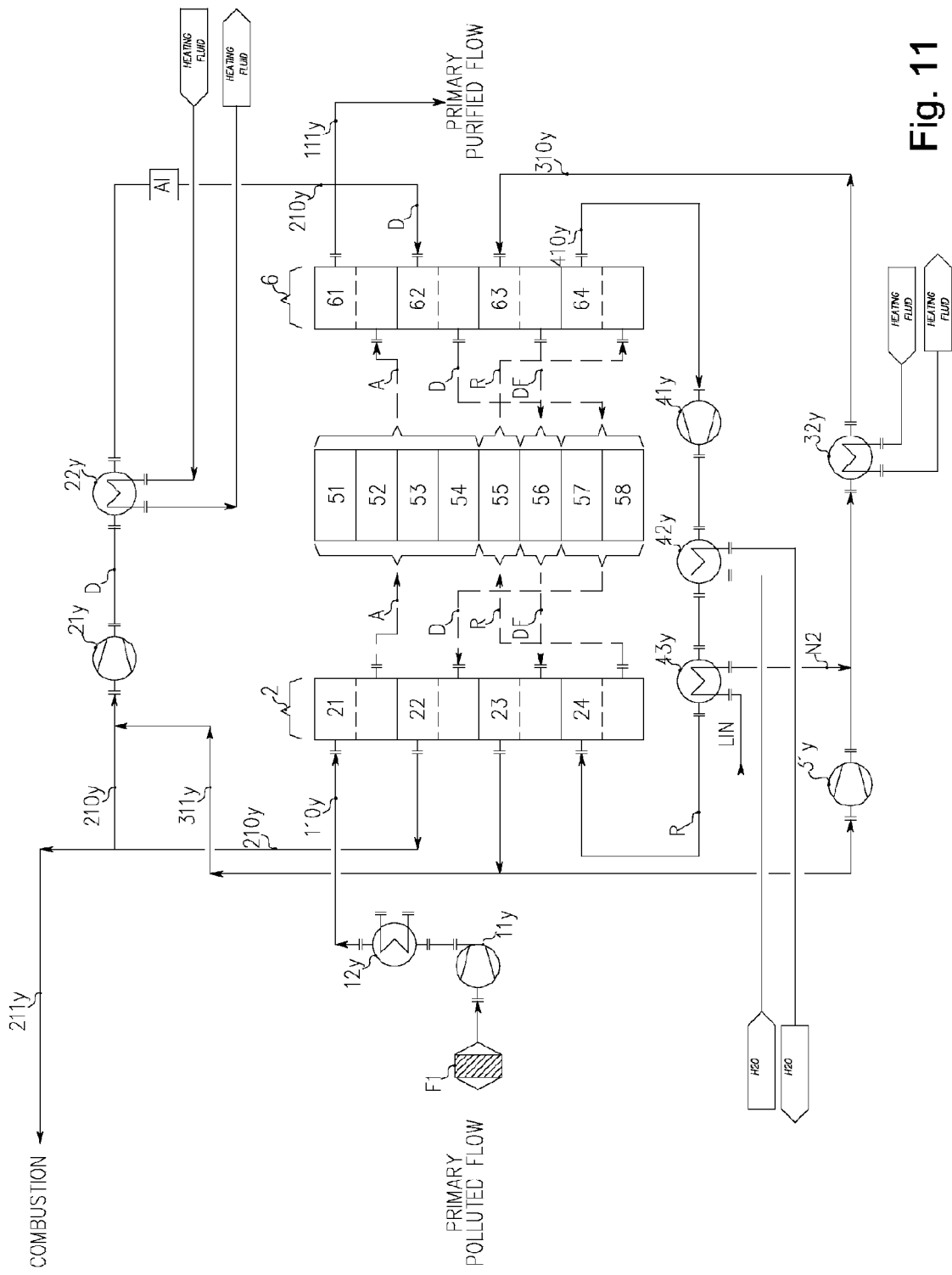
FIG. 11 shows an exemplary application of the apparatus of FIG. 1 for ensuring separation and combustion of volatile compounds, using the inventive method.

Referring to FIG. 11, there is shown an embodiment of the method that uses the same apparatus and includes the same basic steps as in the above process but with a different purpose, i.e. not the recovery of volatile compounds for reuse, which is unfeasible for technical or economic reasons, but their thermal destruction.

In this case, the cooling energy provided by the evaporation of liquid nitrogen in the cryogenic exchanger $13y$ to produce nitrogen gas for stabilization is not used for separating compounds in liquid form, but for further cooling the flow T in $43y$ after first cooling it in $41y$ with water.

The nitrogen N2, which is produced in required amounts for stabilization of desorption circuits, is introduced into the secondary desorption circuit $310y$, which may be open or closed, as shown in this embodiment, wherefrom it flows as $311y$ into the primary desorption closed circuit $210y$.

The overflow $211y$ of the primary desorption circuit is a hot inert flow containing all desorbed volatile compounds at very high concentrations, 100-200 times higher than the primary flow $110y$, with a very high calorific value, wherefore its combustion requires a small-sized system, with low investment and management costs, because no additional fuel is required, and some heat energy may be even recovered for process energy needs.

Example 1

Tests were conducted on a system designed for a treatment volumetric capacity of 10,000 m$^3$/h and provided the following final results in steady state conditions for a flow containing ethyl acetate ad a contaminant, and using a microporous styrene-divinylbenzene resin manufactured by Resindion (Mitsubishi Chemical Corporation).

Volumetric flow rate of air feeding to the system: 9,250 Nm$^3$/h
  Mass flow rate of ethyl acetate: 100 kg/h
  Incoming concentration of ethyl acetate: 10,800 mg/Nm$^3$
  Minimum outflow concentration of ethyl acetate: 10 mg/Nm$^3$
  Maximum outflow concentration of ethyl acetate: 100 mg/Nm$^3$
  Average temperature of incoming flow to the adsorbent beds: 22° C.
  Average temperature of outflow from the adsorbent beds: 25° C.
  Average relative humidity at 22° C.: 55%
  Average primary desorption temperature: 129° C.
  Average secondary desorption temperature: 133° C.
  Average adsorption yield: 21% (255 g ethyl acetate per 1,000 g resin)
  Average purification yield: >99.5%
  (Average) adsorbed humidity: 0.7% (7 g water per 1,000 g resin)
  Residual ethyl acetate in the resin after desorption: 0.8%
  Net operating capacity of the resin: 20.2%
  Average cooling temperature: 25° C.
  Duration of operating cycle: 60 minutes
  Temperature of first condensation stage: 10° C.
  Flow rate of nitrogen for stabilization and cryogenic condensation at −75° C.: 30 Nm$^3$/h
  O2 concentration in circuits: <5% v/v.

Example 2

Tests conducted on the system of the Example 1 provided the following steady-state results for a flow containing ethyl acetate at higher concentrations, using the same resin (same volume):

Volumetric flow rate of air feeding to the system: 9,250 Nm$^3$/h
  Mass flow rate of ethyl acetate: 230 kg/h
  Incoming concentration of ethyl acetate: 19,460 mg/Nm$^3$
  Minimum outflow concentration of ethyl acetate: 10 mg/Nm$^3$
  Maximum outflow concentration of ethyl acetate: 100 mg/Nm$^3$
  Average temperature of incoming flow to the adsorbent beds: 22° C.
  Average temperature of outflow from the adsorbent beds: 27° C.
  Average relative humidity at 22° C.: 55%
  Average primary desorption temperature: 128° C.
  Average secondary desorption temperature: 133° C.
  Average adsorption yield: 27.4% (280 g ethyl acetate per 1,000 g resin)
  Average purification yield: >99.8%

(Average) adsorbed humidity: 0.6% (6 g water per 1,000 g resin)
Residual ethyl acetate in the resin after desorption: 1.1%
Net operating capacity of the resin: 26.3%
Average cooling temperature: 31° C.
Duration of operating cycle: 44 minutes
Temperature of first condensation stage: 10° C.
Flow rate of nitrogen for stabilization and cryogenic condensation at −75° C.: 40 Nm³/h
O2 concentration in circuits: <4% v/v.

Example 3

Tests conducted on the system of the Example 1 provided the following results for a flow containing ethyl acetate, using activated carbon BAC manufactured by Kureha (same volume, greater density):
Volumetric flow rate of air feeding to the system: 9,250 Nm³/h
Mass flow rate of ethyl acetate: 180 kg/h
Incoming concentration of ethyl acetate: 19,460 mg/Nm³
Minimum outflow concentration of ethyl acetate: 15 mg/Nm³
Maximum outflow concentration of ethyl acetate: 100 mg/Nm³
Average temperature of incoming flow to the adsorbent beds: 22° C.
Average temperature of outflow from the adsorbent beds: 29° C.
Average relative humidity at 22° C.: 55%
Average primary desorption temperature: 165° C.
Average secondary desorption temperature: 170° C.
Average adsorption yield: 28% (280 g ethyl acetate per 1,000 g resin)
Average purification yield: >99.7%
(Average) adsorbed humidity: 1.5% (15 g water per 1,000 g resin)
Residual ethyl acetate in the resin after desorption: 1.2%
Net operating capacity of the resin: 26.8%
Average cooling temperature: 35° C.
Duration of operating cycle: 77 minutes
Temperature of first condensation stage: 10° C.
Flow rate of nitrogen for stabilization and cryogenic condensation: 40 Nm³/h
O2 concentration in circuits: <4% v/v.

The invention claimed is:

1. An apparatus for distributing a plurality of fluid flows through a plurality of chambers, the apparatus comprising:
a plurality N of process chambers adapted to contain adsorbent material each chamber having a first and a second fluid lines coupled thereto;
a first and a second flow distribution device each of said distribution devices comprising:
a plurality P of fluid lines;
a plurality X of synchronized distribution valves where X=P, each coupled to a plurality Y of fluid lines where Y=N, and a respective one of said plurality P of fluid lines, wherein said distribution valves are constructed to sequentially provide selective fluid coupling between the respective P line, and at least one of each of said Y lines;
wherein said plurality X of distribution valves being operable simultaneously;
a plurality Z of manifolds where Z=N, each having a plurality A of fluid lines where A=P, wherein each of said plurality A of fluid lines is coupled to the respective Y fluid line of each of said X distribution valves, and wherein the manifold provides fluid communication therebetween;
wherein each of said first lines of said N process chambers is coupled to a respective manifold of said Z manifolds of said first distribution device, and each of said second lines of said N process chambers is coupled to a respective manifold Z of said second distribution device; and,
wherein said first distribution device and said second distribution device are operated synchronously.

2. An apparatus as claimed in claim 1, wherein said plurality of distribution valves of each of said distribution devices comprises plugs, and wherein the plugs of each distribution device rotate about a common axis.

3. An apparatus as claimed in claim 2, wherein said plugs are driven by a drive system comprising a ratchet.

4. An apparatus as claimed in claim 2, wherein each distribution valve of said first and second distribution devices has a wall with a plurality Y of ports formed therein, and wherein each plug being slidlingly movable along the wall, to selectively close at least one of said ports.

5. An apparatus as claimed in claim 1, wherein each of said N process chambers contains adsorbent material retained in said process chambers by meshes.

6. An apparatus as claimed in claim 1 wherein P=4 and N=8.

7. A method for purification of a gas flow containing polluting compounds, comprising the steps of:
Providing an apparatus for distributing a plurality of fluid flows through a plurality of chambers, the apparatus comprising:
a plurality N of process chambers adapted to contain adsorbent material each chamber having a first and a second fluid lines coupled thereto;
a first and a second flow distribution device each of said distribution devices comprising:
a plurality P of fluid lines;
a plurality X of synchronized distribution valves where X=P, each coupled to a plurality Y of fluid lines where Y=N, and a respective one of said plurality P of fluid lines, wherein said distribution valves are constructed to sequentially provide selective fluid coupling between the respective P line, and at least one of each of said Y lines;
wherein said plurality X of distribution valves being operable simultaneously;
a plurality Z of manifolds where Z=N, each having a plurality A of fluid lines where A=P, wherein each of said plurality A of fluid lines is coupled to a respective Y fluid line of said X distribution valves, and wherein the manifold provides fluid communication therebetween;
wherein each of said first lines of said N process chambers is coupled to a respective manifold of said Z manifolds of said first distribution device, and each of said second lines of said N process chambers is coupled to a respective manifold Z of said second distribution device; and,
wherein said first distribution device and said second distribution device are operated synchronously;
distributing, a plurality of separate gas flows, comprising an adsorption flow; at least one primary desorption flow, a secondary desorption flow and a cooling flow among the plurality N of process chambers for simultaneously carrying out an adsorption step, at least one primary desorption step in a closed circuit inert or stabilized gas, a secondary desorption step in an open circuit of inert or stabilized gas and a cooling step;

said distribution being performed in parallel, utilizing said apparatus;

wherein the number of beds where adsorption takes place is greater than the number of beds where primary desorption takes place;

wherein the number of beds where secondary desorption takes place is smaller than the number of beds where primary desorption takes place, wherein the number of beds where cooling takes place is equal to or greater than the number of beds where secondary desorption takes place;

wherein the distribution of said adsorption, desorption, secondary desorption and cooling flows is cyclically changed through N possible configurations; and, wherein the desorption flows are countercurrent to said adsorption and cooling flows.

8. A method as claimed in claim 7, wherein said adsorbent material consists of macroporous styrene-divinylbenzene resins or activated carbons in the form of small-diameter spherules derived from pitch residues of oil distillation, with a very low ash content.

9. A method as claimed in claim 7, further comprising the steps of:

generating an outflow from said primary desorption flow;

injecting a flow of liquid nitrogen in a cryogenic exchanger;

cryogenically purifying said outflow from said primary desorption flow by separating the compounds contained therein in liquid form;

using the nitrogen that evaporates during cryogenic purification to feed the secondary desorption flow; and, using a portion of said purified outflow to feed said secondary desorption flow.

* * * * *